United States Patent
Lee et al.

(10) Patent No.: US 8,005,837 B2
(45) Date of Patent: Aug. 23, 2011

(54) METHOD FOR INSERTING CONTENTS PROVIDED BY EXTERNAL WEB SERVER IN COMMUMITY HOMEPAGE

(75) Inventors: Ram Lee, Gyeonggi-do (KR);
Min-Hyung Hong, Gyeonggi-do (KR);
Hyun-Joo Chung, Seoul (KR)

(73) Assignee: NHN Corporation, Seongnam-si (KR)

( * ) Notice: Subject to any disclaimer, the term of this patent is extended or adjusted under 35 U.S.C. 154(b) by 445 days.

(21) Appl. No.: 11/719,211

(22) PCT Filed: Nov. 10, 2005

(86) PCT No.: PCT/KR2005/003808
§ 371 (c)(1),
(2), (4) Date: May 11, 2007

(87) PCT Pub. No.: WO2006/052093
PCT Pub. Date: May 18, 2006

(65) Prior Publication Data
US 2009/0100011 A1   Apr. 16, 2009

(30) Foreign Application Priority Data
Nov. 12, 2004  (KR) .................... 10-2004-0092665

(51) Int. Cl.
*G06F 17/30* (2006.01)
*G06F 7/00* (2006.01)

(52) U.S. Cl. .................. 707/736; 707/758; 707/770

(58) Field of Classification Search ............... 707/706, 707/722, 736, 758
See application file for complete search history.

(56) References Cited

U.S. PATENT DOCUMENTS

| | | | | |
|---|---|---|---|---|
| 6,473,793 | B1 * | 10/2002 | Dillon et al. | 709/223 |
| 6,990,633 | B1 * | 1/2006 | Miyasaka et al. | 715/201 |
| 2001/0014908 | A1 * | 8/2001 | Lo et al. | 709/203 |
| 2002/0032777 | A1 * | 3/2002 | Kawata et al. | 709/226 |
| 2004/0049413 | A1 * | 3/2004 | Momma et al. | 705/5 |

FOREIGN PATENT DOCUMENTS

| | | | |
|---|---|---|---|
| EP | 1039399 A1 * | 9/2000 | |
| JP | 2000082066 | 3/2000 | |
| JP | 2002189675 | 7/2002 | |

(Continued)

OTHER PUBLICATIONS

Minamioosawa Broadband Research, "Building a community site for a day: Elementary XOOPS Building the 1st Self-governing site", Linux Magazine, Aski Co., Ltd., Jul. 1, 2004, 6th Edition, No. 7, pp. 80-91.

(Continued)

*Primary Examiner* — Tim T. Vo
*Assistant Examiner* — Sangwoo Ahn
(74) *Attorney, Agent, or Firm* — H.C. Park & Associates, PLC

(57) ABSTRACT

Disclosed is a method for inserting contents provided by external web server in community homepage. Community manager sets up key word or search category regarding interest contents, the key word and search category information is transmitted to predetermined web server. The web server derives contents corresponding to key word and search category, the derived contents information is transmitted to community server from the web server. The community server transforms search result information into HTML format and insert in community homepage. Users of community can obtain information which is not uploaded by community members.

17 Claims, 19 Drawing Sheets

FOREIGN PATENT DOCUMENTS

| | | |
|---|---|---|
| JP | 2003067325 | 3/2003 |
| JP | 2003-067100 | 7/2003 |
| JP | 2003208374 | 7/2003 |
| JP | 2004272871 | 9/2004 |
| KR | 10-1999-0001061 | 1/1999 |
| KR | 10-2000-0030249 | 6/2000 |
| KR | 10-2000-0064216 | 11/2000 |
| KR | 10-2002-0000948 | 1/2002 |
| KR | 10-2002-0041370 | 6/2002 |

OTHER PUBLICATIONS

Shakai Lie et al., "A study on building a networking library to which a business model related to information flow market is applied", Electronic Information Communication Institute Technology Research Report, Electronic Information Communication Institute, Apr. 22, 1998, 98th Edition, No. 10, pp. 43-50.

Ishikawa Kou, "Active Mining in Community Web Software", 60th Information Base System Research Document and 52nd Basic Artificial Intelligence Research Document, Artificial Intelligence Institute, Mar. 13, 2003, pp. 49-52.

Masayuki Norikosi, How to Use Yahoo 200%, Nikkei PC Beginners, Aug. 11, 2001, pp. 100-109, vol. 9, NikkeiBP Co., Ltd., Japan.

Takahiro Mashiko, Web Design Tips & Tricks, Web Creators, Sep. 1, 2004, vol. 33, pp. 86, MdN.

* cited by examiner

SELECT SEARCH CATEGORY AND INPUT KEY WORD

NAVER SEARCH | SEARCH CATEGORY  | | 'KEY WORD' |

FIG. 9

| IDENTIFICATION CODE | BOARD UNIQUE ID | ADDRESS INFORMATION | WINDOW SIZE |

FIG. 10

| IDENTIFICATION CODE | BOARD UNIQUE ID | ADDRESS INFORMATION | COMMUNITY ID |
|---|---|---|---|

FIG. 11

| IDENTIFICATION CODE | BOARD UNIQUE ID | ADDRESS INFORMATION | COMMUNITY ID | WINDOW SIZE |

FIG. 14

```
<?xml version="1.0" encoding="EUC-KR" ?>
- <NEWS>
 - <PREMIER>
   <DESC>Main news for each category</DESC>
   <ORG_URL>http://news.naver.com/hotissue/daily_list.php</ORG_URL>
  - <CATEGORY NAME="Society">
   - <ITEM OPTION="0">
    - <URL>
      <![CDATA[http://news.naver.com/hotissue/daily_read.php?
      section_id=100&office_id=061&article_id=0000080813&datetime=2004]
     </URL>
    - <TITLE>
      <![CDATA[Court judge impeachment sign " ]]>
     </TITLE>
    </ITEM>
   - <ITEM OPTION="1">
    - <URL>
      <![CDATA[http://news.naver.com/hotissue/daily_read.php?
      section_id=100&office_id=00&article_id=0000014331&datetime=2904]
     </URL>
    - <TITLE>
      <![CDATA["Examine apology"···"Consider forgiving" ]]>
```

FIG. 15

```
<?xml version="1.0" encoding="EUC-KR" ?>
<bestboom total="100">
- <item_xml>
    <subject>moon geun young- new style!!</subject>
    <url>http://boom.naver.com/3/200411020544533327</url>
  </item_xml>
- <item_xml>
    <subject>Hear, husbands!!</subject>
    <url>http://boom.naver.com/1/200411020450221213</url>
  </item_xml>
- <item_xml>
    <subject>Hey guys~!! </subject>
    <url>http://boom.naver.com/1/200411020510050323</url>
  </item_xml>
- <item_xml>
    <subject>Baseball has its own enchantment </subject>
    <url>http://boom.naver.com/3/200411020130519760</url>
  </item_xml>
- <item_xml>
    <subject> shara pova- white skin disclosed between sunburn skin ~ </subject>
    <url>http://boom.naver.com/3/200411020516329800</url>
  </item_xml>
```

METHOD FOR INSERTING CONTENTS PROVIDED BY EXTERNAL WEB SERVER IN COMMUMITY HOMEPAGE

CROSS REFERENCE TO LAVED APPLICATIONS

This application is a U.S. National Phase Application of International Application PCT Application No. PCT/KR2005/003808 filed on Nov. 10, 2005, which claims the benefit of priority from Korean Patent Application No. 10-2004-0092665 filed on Nov. 12, 2004. The disclosures of International Application PCT Application No. PCT/KR2005/003808 and Korean Patent Application No. 10-2004-0092665 are incorporated herein by reference.

FIELD OF THE INVENTION

The present invention relates to an online community service, more particularly to a method for providing various information through community.

BACKGROUND OF THE INVENTION

As the Internet use is increased, community service which forms group of people based on common interest such as hobby, academics, friendship and so on is being invigorated.

The community service can be used variously depending on the characteristic of community, for example, friendship between members, and obtaining expert information, etc. The type of community is being diversified continuously.

The community homepage is generally designed by manager who is one of community members and the community service provider provides authority for editing menu and homepage screen to manager. Further, postings and files that are important information of community is written or uploaded by community members.

Therefore, community homepage was generally made up of information that was written or uploaded by members, and there was problem that other information besides information uploaded by members cannot be obtained from community homepage. For example, in case of fan club community of particular entertainer, news information about the entertainer is useful information. However, the news information cannot be obtained from community homepage unless one of community members uploads the news.

DETAILED DESCRIPTION OF THE INVENTION

Technical Objects

In order to solve above-mentioned problems of prior art, the present invention provides a method for providing service contents provided by external web server to community members by inserting service contents of external web server to community homepage.

Further, the present invention provides a method for providing service contents of external web server which is appropriate for community characteristic to community members through community homepage.

Furthermore, the present invention provides a method that can provide latest information to users through community homepage by inserting latest contents of external web server into community homepage.

Technical Solution

According to the preferred embodiment of the present invention, there is provided a method for inserting contents provided from external web server into community homepage comprising the steps of: (a) providing a web page by which search key word and search category can be set up; (b) generating a plurality of cases of interest contents request information including search key word and search category set up through the web page provided in step (a); (c) transmitting at least one case of contents request information to predetermined web server; (d) receiving search result information corresponding to the search key word and the search category from at least one web server that received the interest contents request information to store the search result; (e) transforming search result information into predetermined data format to insert the transformed data into corresponding community homepage at user's corresponding homepage request.

The interest contents request information may further include community ID information and information on window size where external contents is inserted.

The web server is preferred to perform searching based on search category and search key word included in the interest contents request information and transforms search result into XML document to transmit.

When the information on window size is included in interest contents request information, the web server selects the number of search results and field information corresponding to the window size in transforming into the XML document.

The search result information transmitted from the web server is preferred to reside on server memory and is updated at predetermined time interval.

When the search results are transmitted without considering window size, the step (e) selects the fields and number of search results corresponding to window size which is predetermined or set up by community manager and transforms selected data into HTML format.

According to another aspect of the present invention, there is provided a method for inserting contents provided from external web server into community homepage comprising the steps of: (a) providing a web page by which external service boards to be inserted into the community homepage can be set up, list of the external service boards being stored in database; (b) generating a plurality of cases of interest contents request information for external boards set up through the web page in step (a); (c) transmitting at least one case of interest contents request information to at least one web server that provides external boards; (d) receiving latest posting information of the boards from the at least one web server that received the interest contents request information to store the received latest posting information of boards; (e) selecting postings using posting information stored in step (d) corresponding to manager setting information by referencing manager setting information set up in step (a) at user's community homepage request; (f) transforming the selected posting information into predetermined data format and inserting into the community homepage.

Address information of web servers that provide external board service may be stored in a database or a server memory.

The web server is preferred to transform the latest posting information into XML format and transmits the transformed latest posting information.

The latest posting information transmitted from the web server is preferred to reside on memory and is updated at predetermined time interval.

The number of postings and posting field may be selected based on window size where postings are inserted which is predetermined or set by manager to be transformed into HTML format in selecting postings of step (f).

The interest contents request information may include unique ID of board set up by community manager.

According to still another aspect of the present invention, there is provided a computer-readable medium including a program containing computer-executable instructions for performing method for inserting contents provided from external contents into community homepage comprising the steps of: (a) providing a web page by which search key word and search category can be set up; (b) generating a plurality of cases of interest contents request information including search key word and search category set up through the web page provided in step (a); (c) transmitting at least one case of contents request information to predetermined web server; (d) receiving search result information corresponding to the search key word and the search category from at least one web server that received the interest contents request information to store the search result; (e) transforming search result information into predetermined data format to insert the transformed data into corresponding community homepage at user's corresponding homepage request.

According to still another aspect of the present invention, there is provided a computer-readable medium including a program containing computer-executable instructions for performing method for inserting contents provided from external contents into community homepage comprising the steps of: (a) providing a web page by which external service boards to be inserted into the community homepage can be set up, list of the external service boards being stored in database; (b) generating a plurality of cases of interest contents request information for external boards set up through the web page in step (a); (c) transmitting at least one case of interest contents request information to at least one web server that provides external boards; (d) receiving latest posting information of the boards from the at least one web server that received the interest contents request information to store the received latest posting information of boards; (e) selecting postings using posting information stored in step (d) corresponding to manager setting information by referencing manager setting information set up in step (a) at user's community homepage request; (f) transforming the selected posting information into predetermined data format and inserting into the community homepage.

BRIEF DESCRIPTION OF THE DRAWINGS

FIG. 9 illustrates a packet configuration of interest contents request information according to another embodiment of the present invention.

FIG. 10 illustrates a packet configuration of interest contents request information according to another embodiment of the present invention.

FIG. 11 illustrates a packet configuration of interest contents request information according to another embodiment of the present invention.

FIG. 14 and FIG. 15 illustrate examples of XML format transformed by web server according to a preferred embodiment of the present invention.

MODE OF INVENTION

Hereinafter, the preferred embodiment of the present invention will be described with accompanying drawings.

1. Outline of the Present Invention and System Model

According to the preferred embodiment of the present invention, technical method and system for inserting contents of an external web server associated with a community to a community homepage is provided. The community is an online group where the Internet users gather based on their interests, and each community has its own characteristic interest. The community is made voluntarily based on various interests such as region, entertainer fan club, entertainment, academics, etc.

As community is made based on characteristic interests, if external contents associated with the community is displayed together, users can get information corresponding to the community interest easily. Herein, the external contents inserted to the community homepage varies according to the time, users can get both community information and information provided from the external web server simultaneously only by visiting the community home page without visiting the external web server.

The contents inserted to the community homepage can be set up variously depending on the community interests.

For example, in case of health related community, a part of Q&A of health related board can be inserted to the community homepage. If Q&A contents is updated, the contents inserted to the community homepage is also updated.

For another example, in case of fan club community for a particular entertainer, news search result of which the key word is the corresponding entertainer can be inserted to the community homepage. For another example, in case of finance related community, current stock information can be inserted.

As described above, the contents inserted to the community homepage can be various such as postings of board, search result for a particular key word, latest information of an external web server. When user requests community homepage, the latest contents at the time when user requests is inserted to the community homepage to be provided to the user client.

Figure 1:
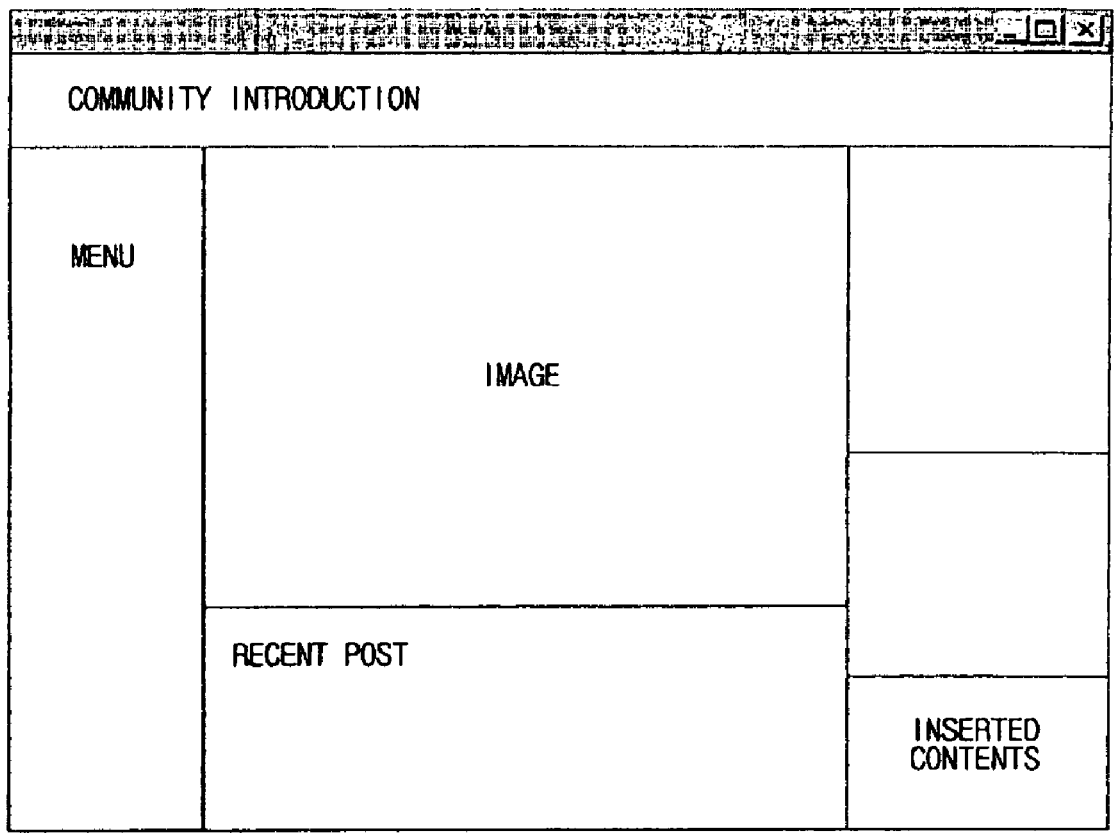
FIG. 1 illustrates an example that contents of an external web server is inserted to a community homepage according to a preferred embodiment of the present invention.

FIG. 1 illustrates an example that contents of an external web server is inserted to a community homepage according to a preferred embodiment of the present invention.

Figure 2:
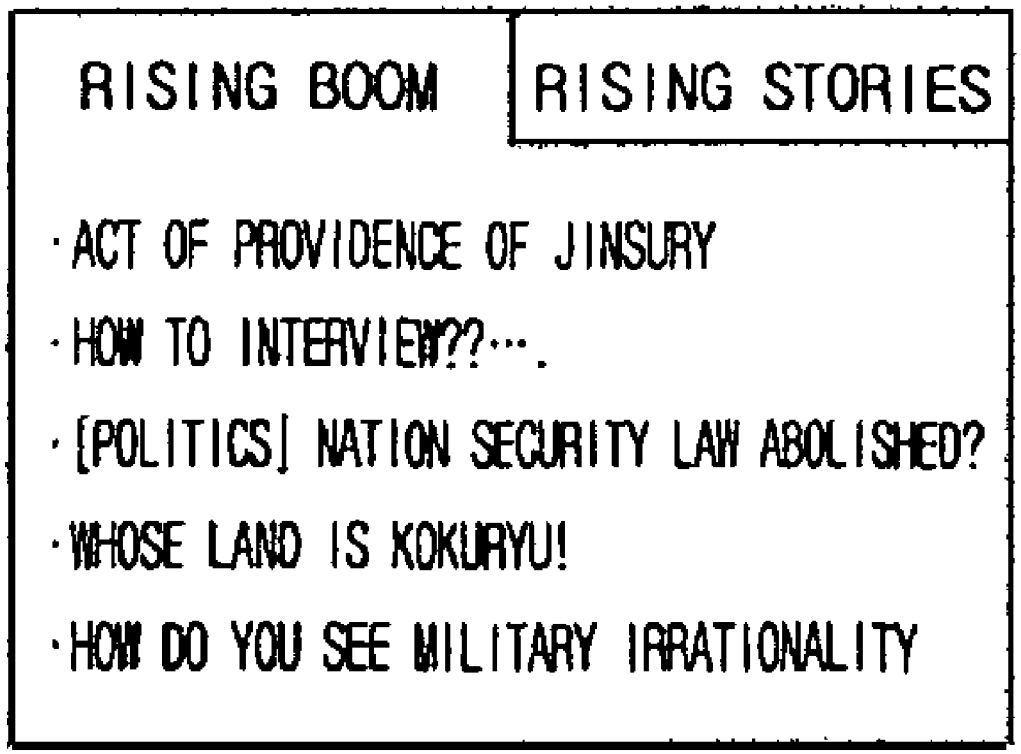
FIG. 2 is an example of contents inserted to a community homepage.

Referring to FIG. 1, board contents of an external web server is inserted to the lower right of the community homepage to be provided to user. FIG. 2 is an example of contents inserted to a community homepage, if a community manager sets up currently popular stories to be inserted to the community homepage, the window in the form of FIG. 2 is inserted to the insertion region which is the lower right of the community homepage.

Figure 3:
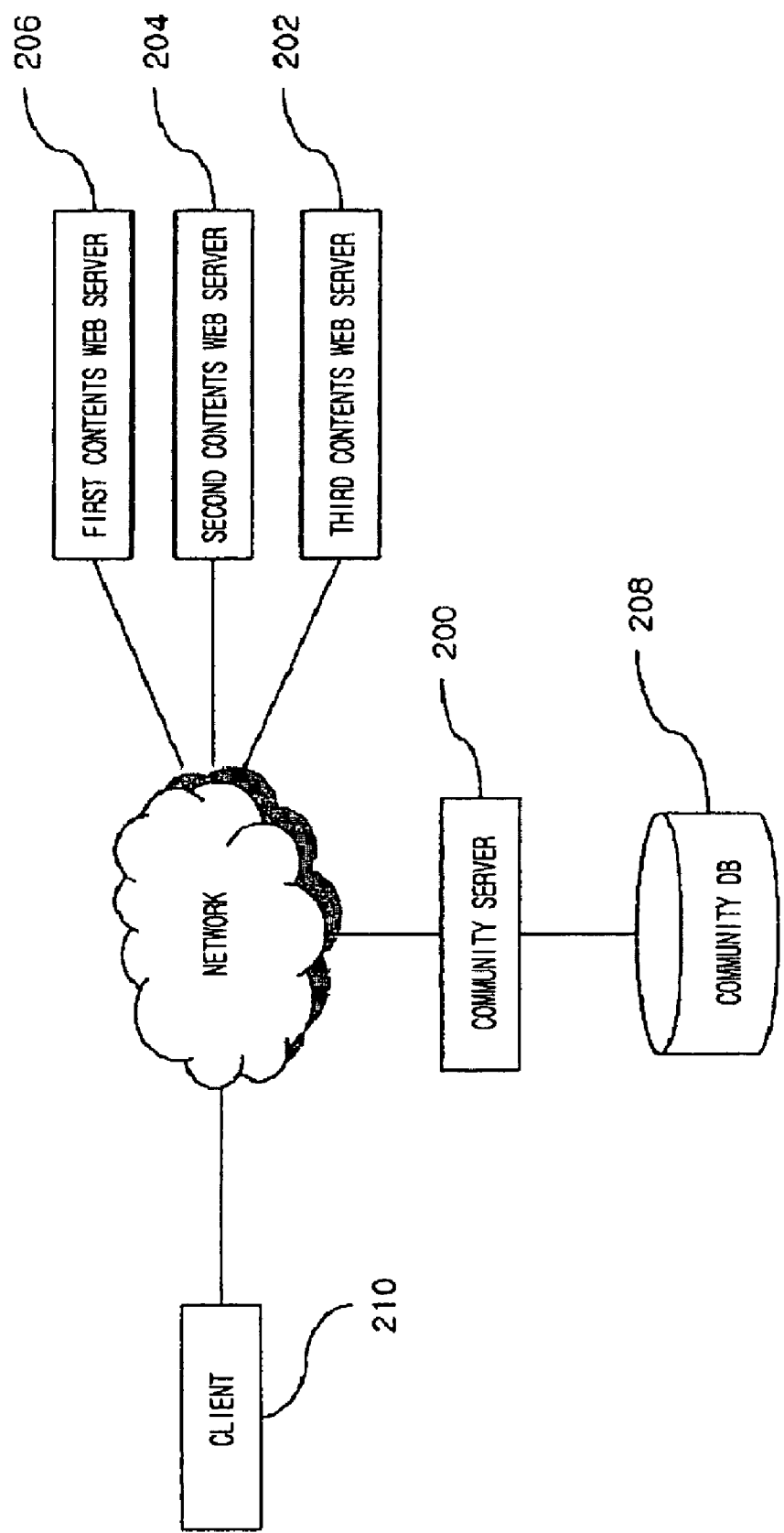
FIG. 3 illustrates a system model for inserting contents of an external web server to a community homepage according to a preferred embodiment of the present invention.

FIG. 3 illustrates a system model for inserting contents of an external web server to a community homepage according to a preferred embodiment of the present invention.

Referring to FIG. 3, the system according to an embodiment of the present invention may comprise a community server 200, a plurality of contents web servers 202, 204, 206 and a community database 208, and user clients that request a community homepage are coupled to the servers that constitute the system of the present invention through network.

In FIG. 3, the community server 200 receives external contents setting information to be inserted to community homepages from managers of each community and manages the received information. For each community, the community manager can set up external contents which is appropriate for each community characteristic and the community server manages the setting information.

Further, the community server requests contents to external web servers and stores the received contents in order to insert into a part of community homepage. Hereinafter, the contents that the community server requests to the external web server is referred to as interest contents. The community server 200 requests to a plurality of contents web servers 202, 204, 205 in order for the community manager to insert various kinds of contents to the community. In order to provide external web server contents to community users in almost real time, the community server 200 sends request information for interest contents to a plurality of external web servers 202, 204 206 at predetermined time intervals, for example about 5 minute interval.

Furthermore, the community server 200 receives interest contents information from external web servers and inserts the received interest contents into a predetermined part of the community homepage at user's community homepage request to provide it to user. According to a preferred embodiment of the present invention, the received interest contents resides on memory of the community server 200 in order to insert the interest external contents to the community homepage rapidly and provide it to user. When user requests the community homepage, the community homepage where interest contents is inserted is provided using the residing data on memory.

The web servers 202, 204, 206 receive interest contents request information from the community server and transform the requested contents into a predetermined format to provide it to the community server 200.

The web servers 202, 204, 206 are servers that provide various kinds of contents. Examples of the web server include board data such as a web server for finance related contents, a web server for academic related contents, and a web server for search service or a web server which provides contents by performing a predetermined process like search.

The present invention can be usefully applied to portal sites which provide community service and search or board data together, the portal sites can set up a communication method between the service web server managed by portal sites and the community server so that it allows to insert the contents managed by the web server to easily into the community homepage.

The web servers 202, 204, 206 analyze interest contents request information transmitted from the community server and derives data corresponding to the requested contents from the database or outputs requested contents data by performing a predetermined process. According to a preferred embodiment of the present invention, the web server 202, 204, 206 transforms the derived or outputted data into a XML format. The XML format is easy to manage text with fields so that the XML format can be applied to the present invention usefully. However, the transformed format in the web server is not limited to XML. After data transformation, the web server 202, 204, 206 transmits the transformed contents data to the community server 200.

General information for community service is stored in the community database 208. For example, information on the established community, information on the number of users that joined the community, personal information of each user, and the like may be stored in the community database 208.

2. Embodiments that a Manager Sets Up Interest Contents to be Inserted

According to the embodiment of the present invention, community managers can set up external service contents to be inserted into a community homepage.

Figure 4:
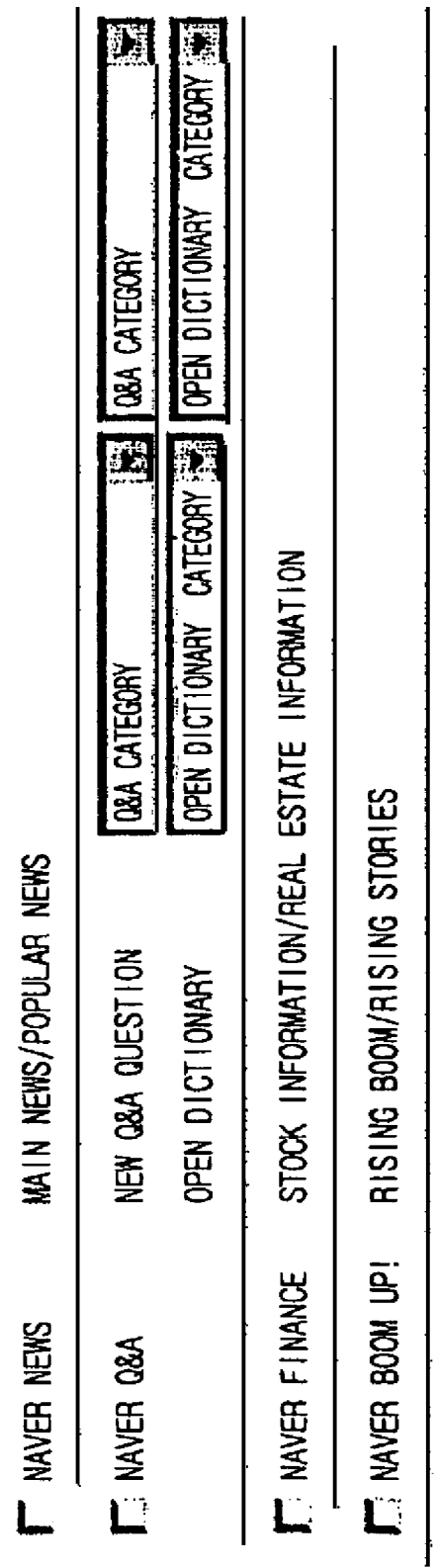
FIG. 4 illustrates an example of community manager web page for setting interest contents, the web page being provided to the community manager.

FIG. 4 illustrates an example of a community manager web page for setting up interest contents, the web page being provided to the community manager.

Referring to FIG. 4, kinds of boards that can be inserted to the community are displayed in the community manager web page, board categories can be set up for some boards to request interest contents.

The manager can select interest contents to be inserted into the community homepage from the board list.

The Board list shown in the manager web page, that is a board list from which the community manager can select to insert into the community homepage, is pre-stored in the community database, the community server generates the manager web page by deriving the stored information in the community database and provides the generated manager web page to the community manager.

Figure 5:
FIG. 5 illustrates another example of community manager web page for setting interest contents that is provided to the community manager.

FIG. 5 illustrates another example of a community manager web page for setting up interest contents that is provided to the community manager.

In FIG. 4, it illustrates a manager setting interface in case that contents which is stored in another web server database is inserted into the community homepage without any additional process. In FIG. 5, it illustrates a manager setting interface in case that data which is outputted through a search process is inserted into the community homepage.

Referring to FIG. 5, in case of inserting the search result into the community homepage, an interface for selecting search category and inputting search key word is provided to the manager.

In case of fan club community for an entertainer, the manager can select news as search category and input name of the corresponding entertainer as search key word in order to provide the latest news corresponding entertainer whenever users visit the community homepage.

It would be obvious to those skilled in the art that manager interfaces such as FIG. 4 and FIG. 5 can be provided in one web page and manager can select one of board contents and search contents as the interest contents.

Although it is not shown in FIG. 4 and FIG. 5, interfaces for controlling external contents insertion location and window size for inserting external contents can be further provided, and therefore, community homepages in great variety of locations where external contents are displayed and sizes for external contents depending on the manager setting information can be provided to users.

3. Embodiments for Generating Interest Contents Request Information.

The community server generates variable interest contents request information based on the predetermined setting information and manager setting information. Hereinafter, detailed embodiments are described.

(1) In Case that Predetermined Interest Contents Request Information is Generated.

According to an embodiment of the present invention, the community server can generate interest contents request information without regard to manager settings to transmit the request information to a web server. This embodiment can be applied in case that data such as board data stored in a web server database is inserted as the interest contents. When only data such as board data stored in web server database is inserted as the interest contents, generating interest contents request information depending on the manager setting may be ineffective. It is preferable to request a web server periodically by a predetermined request format.

Figure 6:
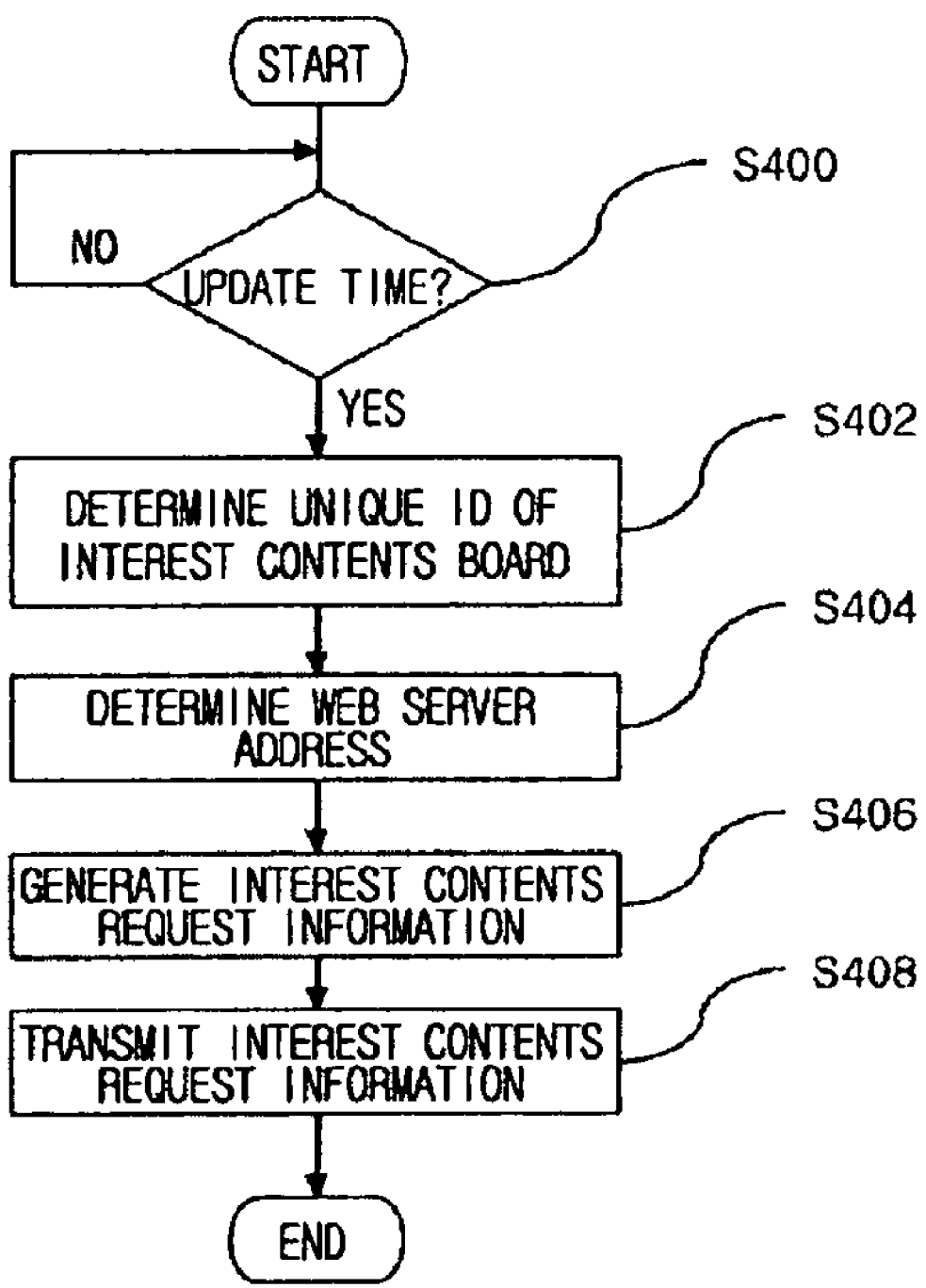
FIG. 6 illustrates a flow chart for transmitting predetermined interest contents request information according to a preferred embodiment of the present invention.

FIG. 6 illustrates a flow chart for transmitting predetermined interest contents request information according to a preferred embodiment of the present invention.

Referring to FIG. 6, it is determined if it is time to transmit interest contents request information to web servers S400. As described above, the community server transmits the interest contents request information to web servers at predetermined time intervals so that the lastly updated contents is to be inserted to the community homepage.

If it is time to transmit interest contents request information, the community server determines unique ID of board corresponding to interest contents using the information of database S402. Boards list and unique ID of each board is stored in the database.

After unique ID of board corresponding to the interest contents is determined, the community server determines address information of web server to which corresponding board data is requested S404. A module for matching unique ID of board and web server address may be included and the matching module outputs address information corresponding to each board ID. Otherwise, web server address information corresponding each unique ID of board can be stored in the database together.

When unique ID of board and web server address information, to which board contents is requested, is determined, the interest contents request information including the unique ID of board and web server address information is generated S406. As one of a plurality of board contents is inserted into the community homepage, a plurality of interest contents request information is generated.

After generating interest contents request information, the community server transmits the interest contents request information to each of corresponding web servers S408.

Although the process for generating the interest contents request information is described sequentially in FIG. 6, in practical system, the interest contents request information for each of unique ID of board is predetermined, and the predetermined interest contents request information can be transmitted at predetermined time intervals.

(2) Case that Interest Contents Request Information is Generated Based on Manager Setting Information.

Unlike embodiments of FIG. 4, the interest contents request information is generated for each community based on manager setting information. At this case, data outputted through a predetermined process as well as data stored in a web server database can also be inserted to the community homepage.

Figure 7:
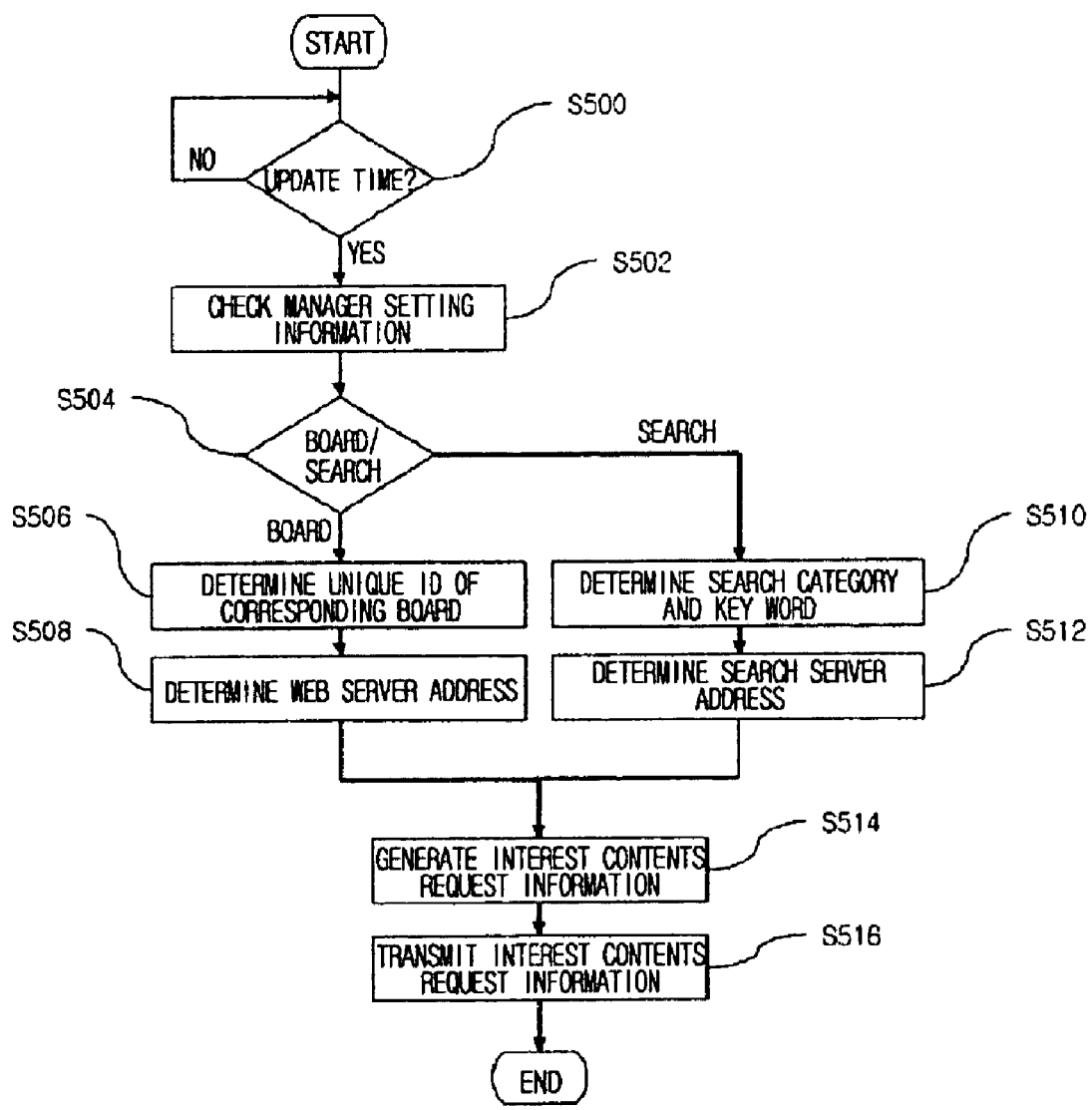
FIG. 7 illustrates a flow chart for generating interest contents request information based on manager setting information.

FIG. 7 is a flow chart illustrating a process for generating interest contents request information based on the manager setting information.

Referring to FIG. 7, it is determined if it is time to update interest contents like FIG. 6 S500.

If it is time to update interest contents, manager setting information of each community is checked S502.

If a community manager sets up to insert pre-stored contents such as board S504, the community server reads unique ID of the corresponding board S506. The unique ID of board may be stored in database, the unique ID of board set up by the manager may be read through database.

After unique ID of board set up by manager is read, address information of web server that provides corresponding board service is determined S508. As described above, the web server address information may be stored by associating with board unique ID in the database or web sever address may be outputted through web server address matching module.

If a community manager sets up interest contents which is outputted through a predetermined process of web server such as search, the community server reads search category and key word set up by the manager S510. Further, the community server determines address information of search server to which search is requested S512.

The community server generates interest contents request information using the derived information through S506-S512. As the interest contents request information is generated for each of community, community ID may be included in header. The generated interest contents request information is transmitted to a corresponding web server S516.

(3) Packet Configuration of the Interest Contents Request Information.

Figure 8:
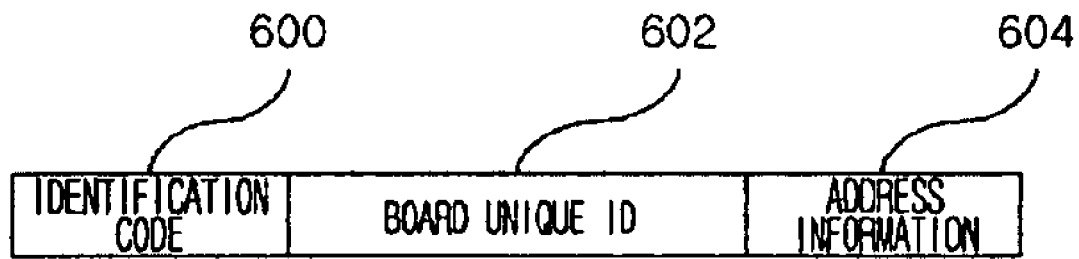
FIG. 8 illustrates a packet configuration of interest contents request information according to an embodiment of the present invention.

FIG. 8 illustrates a packet configuration of interest contents request information according to an embodiment of the present invention.

Referring to FIG. 8, the interest contents request information may comprise an identification code 600, a unique ID of board 602, address information 602 as header information. FIG. 8 is a packet configuration when interest contents is predetermined without regard to manager settings and the corresponding interest contents is requested at predetermined time intervals.

FIG. 9 illustrates a packet configuration of interest contents request information according to another embodiment of the present invention.

Compared with FIG. 8, window size information is further included in header information. The window size information can be used in determining size of contents derived from the web server that received the interest contents request information. This will be described in more detail.

FIG. 10 illustrates a packet configuration of interest contents request information according to another embodiment of the present invention. Compared with FIG. 8, community ID is further included as header information. FIG. 10 is a packet configuration when interest contents request information is generated for each community like FIG. 7, and community ID is included in the packet in order to determine from which community the packet is sent.

FIG. 11 illustrates a packet configuration of interest contents request information according to another embodiment of the present invention. Compared with FIG. 10, window size information is further included in the packet header. The window size information like FIG. 9 is used in determining contents size to be derived from the web server.

In FIG. 10 and FIG. 11, search category and search key may be included instead of unique ID of board when the manager sets up interest contents as search result.

4. Embodiments for Deriving and Transmitting Interest Contents from Service Web Servers FIG. 12 illustrates a flow chart for deriving interest contents to provide it to a community server according to an embodiment of the present invention.

Figure 12:
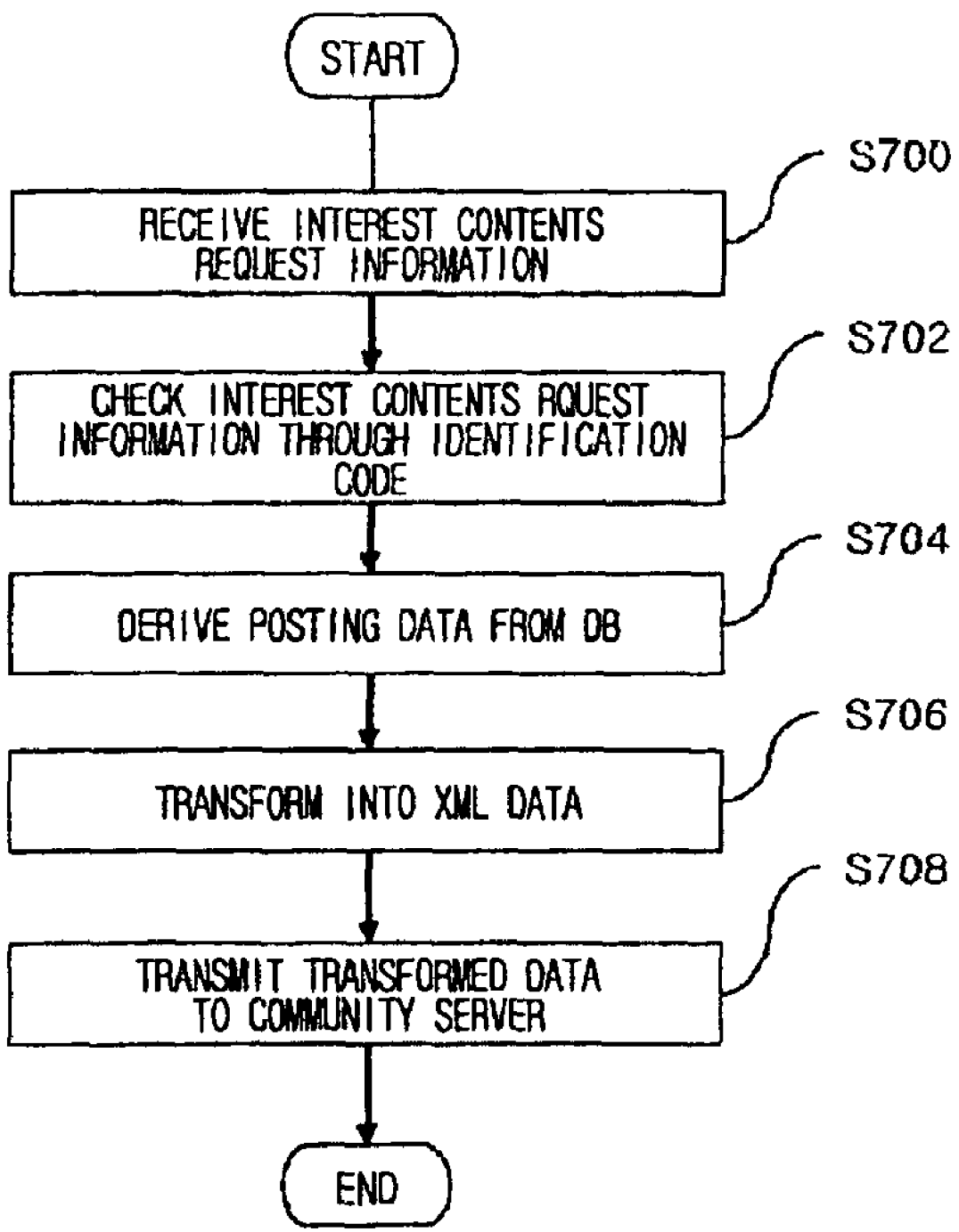
FIG. 12 illustrates a flow chart for deriving interest contents to provide it to community server according to an embodiment of the present invention.

Referring to FIG. 12, a web server receives interest contents request information from the community server S700. The web server determines that the received packet is interest contents request packet through header information of the packet.

The web server determines the kind of board contents through header information of the packet. S702.

The web server derives board data corresponding to the requested board from database S704.

According to an embodiment of the present invention, the number of postings of board is predetermined and the predetermined number of postings of board are derived from the database. Generally, posting comprises a plurality of fields (number, title, writer, data, etc.). As the interest contents is displayed in a limited window, all field data doesn't need to be derived so that not only the number of postings of board but also data field to be derived may be predetermined.

According to another embodiment of the present invention, if window size information is included in the interest contents request information, a web server may control the data field and the number of postings to be derived. As described above, the manager may control window size where interest contents is inserted and window size setting information set up by the manager is included in the interest contents request information to be transmitted to the web server. The web server may select data field and the number of postings to be derived through a predetermined selection algorithm or matching table according to the window size.

After the requested posting data is derived, the web server transforms the derived data into a XML format S706. As described above, XML format is preferable when text data with a plurality of fields is managed.

FIG. 14 and FIG. 15 illustrate examples of XML format transformed by the web server according to a preferred embodiment of the present invention.

Referring to FIG. 14 and FIG. 15, FIG. 14 is an example that news board data is transformed into a XML format, and FIG. 15 is an example that popular story board data is transformed into a XML format.

Referring to FIG. 14 and FIG. 15, XML data may include board category, posting title, URL information corresponding to each posting title, etc. XML data may be diversified depending on kinds of postings.

The transformed board data into a XML format such as FIG. 14 and FIG. 15 is transmitted to the community server 708.

(2) In Case for Transmitting Data after Performing a Predetermined Process.

Figure 13:
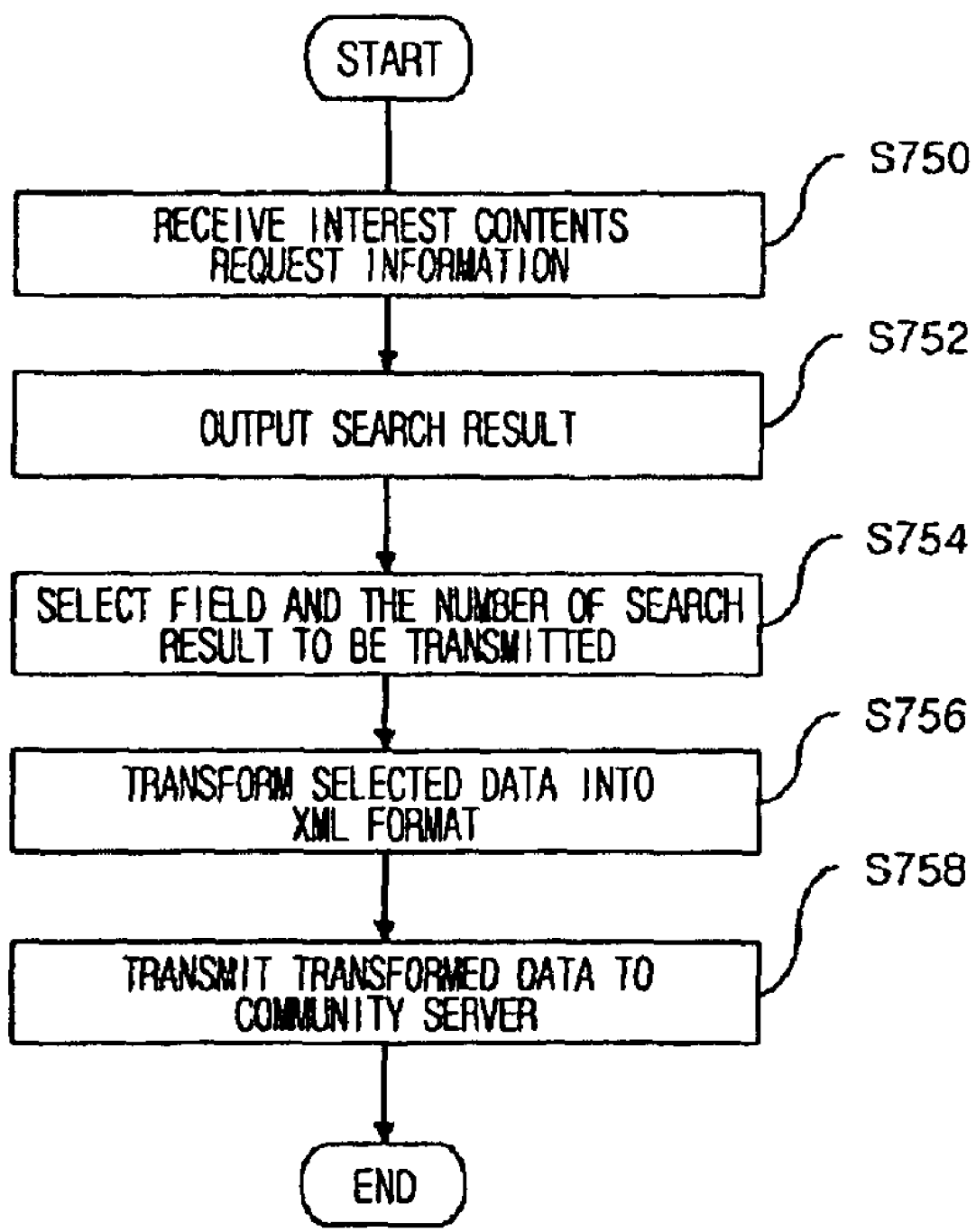
FIG. 13 illustrates a flow chart for deriving interest contents to provide it to community server according to another embodiment of the present invention.

FIG. 13 illustrates a flow chart for deriving interest contents to provide it to the community server according to another embodiment of the present invention. FIG. 13 illustrates the case that search contents is requested.

Referring to FIG. 13, the web server (herein, search server) receives interest contents request information from the community server S750. As described above, the web server determines that the received packet is interest contents request packet through header information of the packet.

The web server performs searching using search category and search key word included in the interest contents request information and outputs the search result S752.

The web server selects the number of search result and field to be transmitted S754. As described above, the number of search result and field may be predetermined, otherwise, the number of search result and field may be determined variably using window size information included in the interest contents request information.

If search result data and field to be transmitted are selected, the selected data is transformed into XML data such as FIG. 14 and FIG. 15 S756. The transformed data is transmitted to the community server S758. In case of search data, as the community server requests based on the manager setting information, the web server let community ID information be included in the header of the transformed information in order to check community that will receive the transformed contents data.

5. Embodiments for Inserting Received Interest Contents Data into Homepage and Providing Community Homepage (1) In Case that Interest Contents is Requested without Referencing Manager Setting Information FIG. 16 illustrates a flow chart for inserting interest contents data into a community homepage when the interest contents is requested without referencing manager setting information.

Figure 16:
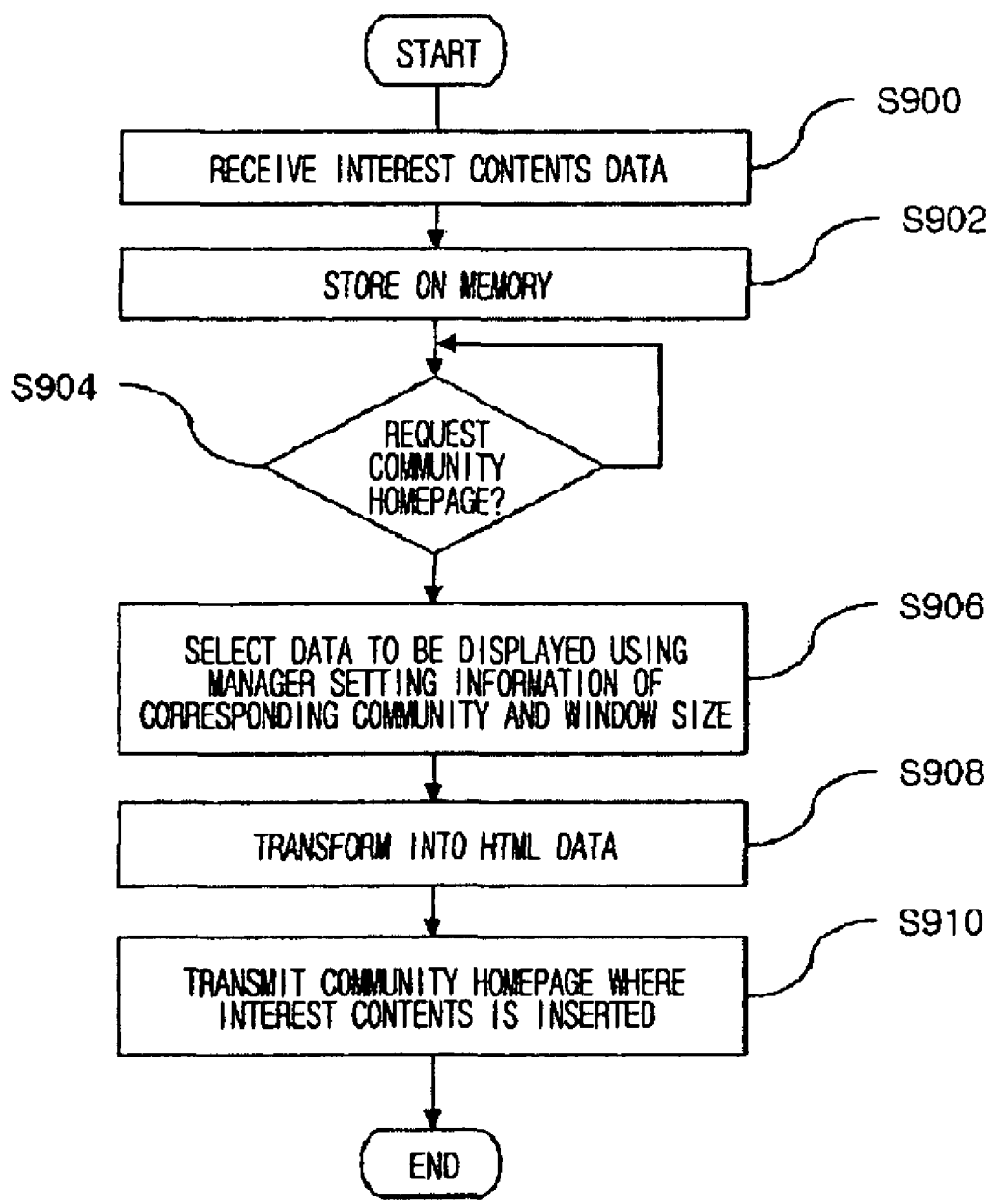
FIG. 16 illustrates a flow chart for inserting interest contents data into community homepage when interest contents is requested without referencing manager setting information.

Referring to FIG. 16, the community server receives interest contents information from web servers S900 and the received contents resides on memory S902. As described above, in order to access the interest contents data and insert it to the community homepage with high speed, the received interest contents data resides on the community server memory.

When the community homepage request information is received, the community server reads manager setting information of the community that user requested. The community server that read the manager setting information of the corresponding community derives data corresponding to board that the manager set up from memory S906. Overall interest contents that managers can set up is requested and stored on memory without referencing manager setting information, and data corresponding to the manager setting information is selected and derived from memory in constructing each homepage. In deriving data from memory, all data of corresponding board is not derived necessarily. Considering size of window where interest contents is inserted, the number of postings and field of posting is determined and only the corresponding data is derived.

The community server transforms the interest contents into HTML data with a predetermined size using derived data S908.

After HTML transformation of the interest contents, the community server inserts the transformed HTML data into a predetermined homepage format and transmit to user client S910.

Figure 17:
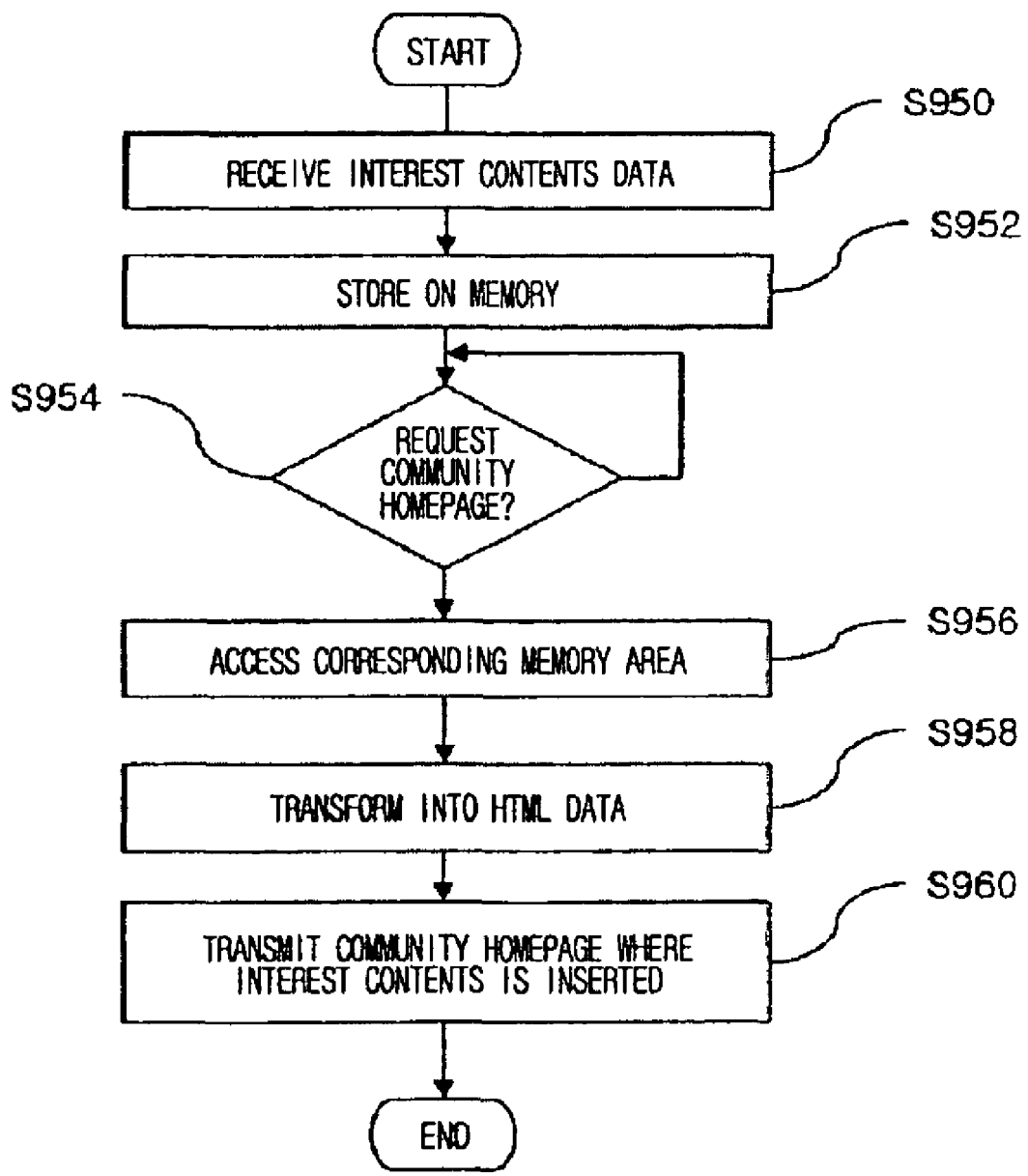
FIG. 17 illustrates a flow chart for inserting interest contents data into community homepage when interest contents is requested without referencing manager setting information.

(2) In Case that Interest Contents is Requested Referencing Manager Setting Information FIG. 17 illustrates a flow chart for inserting interest contents data into a community homepage when the interest contents is requested with referencing manager setting information.

Referring to FIG. 17, the community server receives interest contents from web servers S950 and the received interest contents data reside on memory S952. As the interest contents corresponding to the manager setting information is received, it is preferable that the community server stores the interest contents data on memory area that is allotted for each community.

When user's community homepage request information is received, the community server accesses memory area where the interest contents data of the corresponding community is stored S956.

The community server transforms XML format data stored in the allotted memory area into HTML data S958. When the web server transmits the interest contents without considering size of window where interest contents is inserted, it is preferable that part of data that can be inserted to window among data stored in memory is transformed to HTML format.

After HTML transformation for the interest contents, the community server inserts the transformed HTML data into a predetermined homepage format and transmit to user client S960.

6. Embodiments for Community Server Module and Web Server Module

Figure 18:
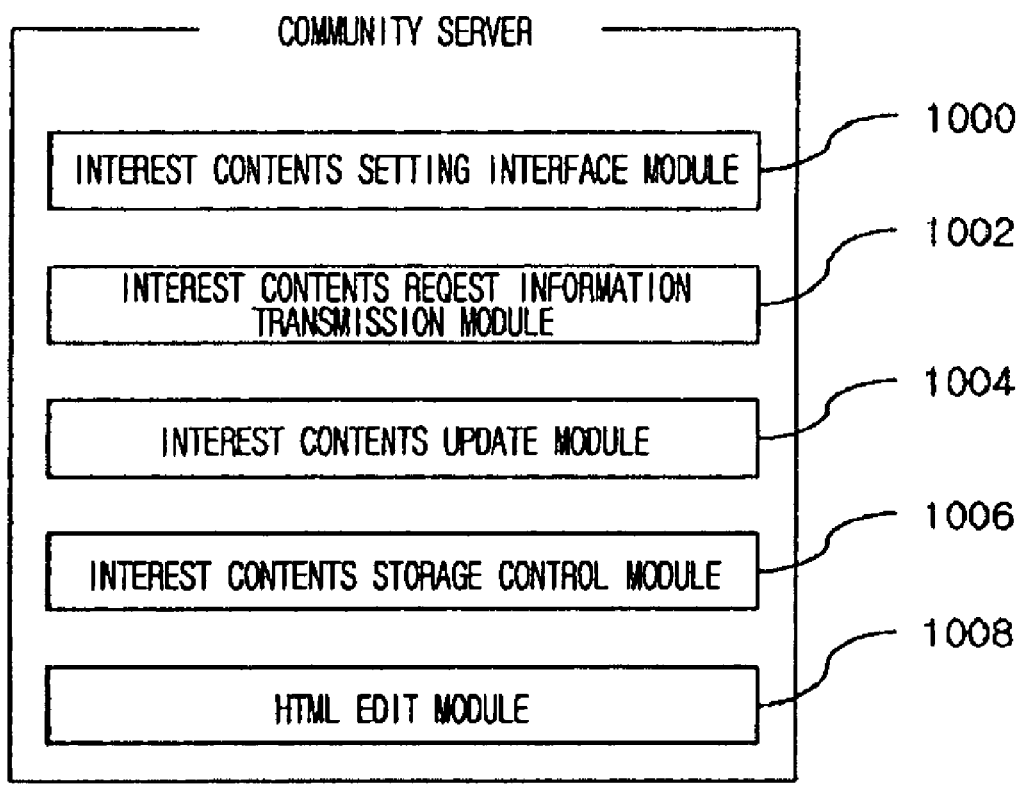
FIG. 18 illustrates module configuration of community server according to a preferred embodiment of the present invention.

FIG. 18 illustrates module configuration of the community server according to a preferred embodiment of the present invention.

Referring to FIG. 18, the community server according to a preferred embodiment of the present invention may comprise an interest contents setting interface module 1000, an interest contents request information transmitting module 1002, an interest contents update control module 1004, an interest contents storage control module 1006 and a HTML edit module 1008.

The interest contents setting interface module 1000 provides an interface web page in which managers can set up interest contents. The interest contents setting interface module 1000 generates an interface web page such as FIG. 4 and FIG. 5 and provide it to the manager. As described above, the board information that can be requested as interest contents is stored in database, the interest contents setting interface module generates a web page using information stored in database and enables the manager to select board.

The interest contents request information transmitting module 1002 generates interest contents request information to transmit. If only the predetermined contents of board is provided as interest contents, the interest contents request information transmitting module 1002 does not refer manager setting information and transmit interest contents request information to corresponding web servers. Packet configuration of interest contents is shown in FIG. 8 to FIG. 11.

The interest contents update control module 1004 controls the interest contents request information transmitting module so that the interest contents request information is transmitted at predetermined time intervals.

The interest contents storage control module 1006 stores the transmitted interest contents from a plurality of web servers on web server memory. When interest contents is requested referencing manager setting information for each community, the interest contents storage control module 1006 stores the interest contents data for each community on a predetermined area of memory.

The HTML edit module 1008 transforms interest contents data residing on memory into HTML format data to insert transformed data to community homepage.

The HTML edit module 1008 applies hyperlink to the interest contents in editing HTML page so that user can move to the web page providing more detailed contents when user clicks the hyperlink.

Figure 19:
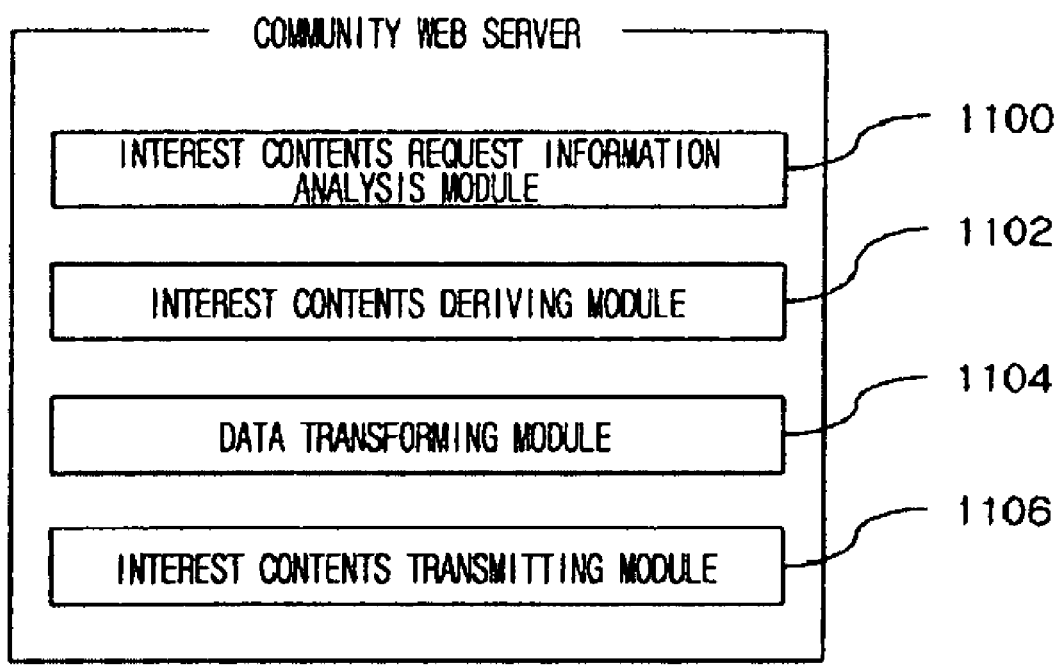
FIG. 19 illustrates module configuration of web server according to a preferred embodiment of the present invention.

FIG. 19 illustrates module configuration of the web server according to a preferred embodiment of the present invention.

Referring to FIG. 19, the web server according to a preferred embodiment of the present invention may comprise an interest contents request information analysis module 1100, interest contents deriving module 1102, data transforming module 1104 and interest contents transmitting module 1106.

In FIG. 19, the interest contents request information analysis module 1100 analyzes interest contents request information through header information after receiving the interest contents request information. The interest contents request information analysis module 1100 determines if data stored in the database such as board is requested or data outputted through predetermined process such as search is requested. According to the determination, control signal is provided to the interest contents deriving module 1102. When pre-stored data such as board is requested, the interest contents request information analysis module 1100 output unique ID of board to interest contents deriving module 1102. When search result is requested, search category and key word information is provided to the interest contents deriving module.

The interest contents deriving module 1102 derives the requested interest contents data according to output information of the interest contents request information analysis module 1000. In case of pre-stored data such as board, board information corresponding to unique ID of board is derived from database. In case of search data, search result is outputted using search category and search key word and output data is derived. As described above, predetermined number of search result and predetermined field may be derived and the number of search result and field may be controlled according to window size.

The data transforming module 1104 transforms interest contents module into XML format document.

The interest contents transmitting module 1106 transmits XML format interest contents to community server.

INDUSTRIAL APPLICABILITY

As described above, according to the preferred embodiments of the present invention, service contents provided by an external web server can be provided to community members by inserting service contents of the external web server to the community homepage.

Further, service contents of the external web server which is appropriate for community characteristic to community members can be provided through the community homepage.

Furthermore, the latest information can be provided to users through the community homepage by inserting the latest contents of the external web server into the community homepage.

The invention claimed is:

1. A computer-implemented method for importing contents from an external content web server into a community homepage, the method comprising:

receiving from a user an information request for a search result, the information request comprising a packet header, a search keyword and a search category;

transmitting the information request to one or more content web servers which search the contents based on the search keyword and the search category;

selecting, by the one or more content web servers, search result and field information corresponding to the selected search result based on window size information of the packet header;

receiving the search result and the field information corresponding to the information request from at least one of the one or more content web servers, wherein a size of the search result to be output is determined based on the window size information of the packet header;

converting the received search result into search result in a first predetermined data format;

converting, in response to a request of a community homepage, the search result in the first predetermined data format into search result in a second predetermined data format, wherein the second predetermined data format corresponds to the community homepage; and outputting the contents in the second predetermined data format to the community homepage, wherein the contents in the second predetermined data format are adjustably displayed to a portion of the community homepage according to the determination based on the window size information of the packet header.

2. The method of claim 1, wherein the information request further comprises community ID information.

3. The method of claim 1, wherein the content web servers are configured to perform searching a database based on the search category and the search keyword associated with the transmitted information request and to convert the search result into the first predetermined data format comprising an extensible markup language (XML) format and to convert the first predetermined data format into the second predetermined data format comprising a hyper text markup language (HTML) format.

4. The method of claim 1, wherein the search result transmitted from the at least one of the one or more content web servers is updated at a predetermined time interval.

5. The method of claim 1, wherein only a portion of the received search result information is displayed if the data size of the received search result is larger than a predetermined size.

6. A computer-implemented method for importing contents from an external web server into a community homepage, the method comprising:

receiving an information request from a user via an interface for an external service board;

transmitting the information request for the external service board to at least one of content web servers to search contents, the information request comprising a packet header, a search keyword and a search category;

selecting search result and field information corresponding to the selected search result according to window size information of the packet header, wherein a size of the search result to be output is determined based on the window size information of the packet header;

converting the selected search result into search result in a first predetermined data format;

converting, in response to a request of a community home page information, the search result in the first predetermined data format into search result in a second predetermined data format, wherein the second predetermined data format corresponds to the community homepage information; and outputting the search result in the second predetermined data format to the community homepage where the search result in the second predetermined data format is adjustably displayed to a portion of the community homepage according to the window size information of the packet header.

7. The method of claim 6, wherein address information of the content web servers is stored in a database or a memory.

8. The method of claim 6, wherein the content web servers are configured to convert posting information associated with the search result into information in the first predetermined data format comprising an extensible mark up (XML) format, and to convert the first predetermined data format of the posting information into the second predetermined data format comprising a hyper text markup language (HTML) format.

9. The method of claim 8, wherein the posting information transmitted from the content web servers is updated at a predetermined time interval.

10. The method of claim 8, wherein a portion of the posting information is displayed if the data size of the received posting information is larger than a predetermined size.

11. The method of claim 6, wherein the information request comprises a unique identification (ID) of a board set up by a community manager.

12. A non-transitory computer-readable recording medium carrying one or more sequences of one or more instructions which, when executed by one or more processors, perform the steps of claim 6.

13. A non-transitory computer-readable recording medium carrying one or more sequences of one or more instructions which, when executed by one or more processors, perform the steps of claim 1.

14. A method, comprising:

receiving an information request of interest contents transmitted from a user using a window screen frame via data network, the interest contents corresponding to a search keyword and a search category, the information request comprising a packet header, a search keyword and a search category;

transmitting the information request to one or more content web servers;

selecting, by the one or more content web servers, the interest contents and field information according to window size information of the packet header, wherein sizes of the interest contents derived from the one or more content web servers and sizes of the interest contents to be output are determined based on the window size information of the packet header;

and outputting, in response to a request from a user homepage, the selected interest contents, wherein the interest contents in a first predetermined format are converted into interest contents in a second predetermined format to display to the user homepage via the data network, wherein the interest contents in the second predetermined data format are adjustably displayed to a portion of the user homepage according to the determination based on the window size information of the packet header.

15. The method of claim 14, wherein the first predetermined format comprises an extensible markup language (XML) format.

16. The method of claim 14, wherein the second predetermined format comprises a hyper text markup language (HTML) format.

17. The method of claim 14, wherein the packet header comprises a first packet header comprising access information to a database and content web server unique identification (ID), and a second packet header comprising a user homepage identification (ID).

* * * * *